United States Patent Office 3,370,096
Patented Feb. 20, 1968

3,370,096
HALOGEN EXCHANGE PROCESS
George R. Donaldson, Barrington, and George R. Lester, Mount Prospect, Ill., assignors to Universal Oil Products Company, Des Plaines, Ill., a corporation of Delaware
No Drawing. Filed Sept. 23, 1965, Ser. No. 489,757
14 Claims. (Cl. 260—648)

ABSTRACT OF THE DISCLOSURE

Halogen exchange of the halogen of a halo-hydrocarbon with a different halogen contained in a Friedel-Crafts metal halide composited with alumina or other oxide support, preferably containing a Group VIII metal, such as platinum, said exchange preferably being effected in the presence of hydrogen.

---

This invention relates to a novel halogen exchange process. More specifically, this invention concerns a process for exchanging a halogen of a halogen substituted hydrocarbon with a different halogen and a novel halogen exchange agent with respect thereto.

The facility and selectivity of halogenation reactions is largely influenced by the particular halogen involved. For example, chlorination requires comparatively mild reaction conditions but it is quite nonselective, and while bromination affords a higher degree of selectivity it requires somewhat more severe reaction conditions, and the extremely severe reaction conditions required for iodination adversely affect selectivity of the reaction. The stability of alkyl halides as well as their manner of decomposition are likewise influenced by the particular halogen involved. For example, thermal decomposition of vicinal dichloroalkanes yields a diolefin and hydrogen chloride while the vicinal dibromoalkanes yield a diolefin, considerable acetylenic by-products and hydrogen bromide, and the unstable diiodides are thermally decomposed to yield a monoolefin and elemental iodine.

There are many instances wherein it would be desirable to halogenate an alkane, for example, with one halogen and thereafter substitute the halogen of the resulting haloalkane with a different halogen to take advantage of the particular characteristics of each of the halogens. One such instance is in the conversion of butene-2 to butadiene. While bromine will add directly to the former compound to form 2,3 - dibromobutane, thermal or catalytic decomposition causes the formation of undesirable acetylenic by-products. On the other hand, chlorination of the butene-2 yields polychlorinated butenes as well as monochlorobutenes, and decomposition produces a variety of acetylenes and other undesirable by-products. It would be highly desirable to initially utilize the bromination reaction for selectivity to obtain the 2,3-dibromobutane and thereafter exchange chlorine for the bromine to form 2,3-dichlorobutane which, upon decomposition, yields the desired butadiene to the substantial exclusion of undesirable acetylenic by-products.

It is therefore an object of this invention to present a method for exchanging the halogen of a halogen substituted hydrocarbon with a different halogen, and to introduce a novel halogen exchange agent with respect thereto. In one of its broad aspects, the present invention embodies a process for exchanging a halogen of a halogen substituted hydrocarbon with a different halogen, which process comprises contacting said halogen substituted hydrocarbon with a halogen exchange agent at a temperature in excess of about 25° C. and less than the dehydrohalogenation temperature of the halogen substituted hydrocarbon, said halogen exchange agent comprising a Friedel-Crafts metal halide composited with a refractory oxide, and said metal halide comprising halogen different than the halogen of the halogen substituted hydrocarbon starting material.

Another embodiment relates to a process for exchanging a halogen of a halogen substituted hydrocarbon with a different halogen, which process comprises contacting said halogen substituted hydrocarbon and hydrogen with a halogen exchange agent at a temperature in excess of about 25° C. and less than the dehydrohalogenation temperature of the halogen substituted hydrocarbon, said halogen exchange agent comprising an aluminum halide and a Group VIII metal composited with alumina, and said aluminum halide comprising halogen different than the halogen substituted hydrocarbon starting material.

A more specific embodiment is in a process for exchanging a bromine substituent of a bromoalkane with chlorine which comprises contacting said bromoalkane and hydrogen with a halogen exchange agent at a temperature in excess of about 25° C. and less than the dehydrohalogenation temperature of the bromoalkane, said halogen exchange agent comprising aluminum chloride and platinum composited with alumina.

Other objects and embodiments of this invention will become apparent in the following detailed specification.

The process of this invention is operable to exchange the halogen of halogen substituted hydrocarbons in general, including halogen substituted alicyclic and cyclic hydrocarbons, also unsaturated halohydrocarbons, particularly olefinically unsaturated halohydrocarbons. Halogen substituted hydrocarbons which can be treated in accordance with the present process thus include such as propyl chloride, isopropyl chloride, 1,1-dichloropropane, 1,2-dichloropropane, 1,3-dichloropropane, 2,3-dichloropropane, 1,4-dichlorobutane, amyl chloride, 2-chloropentane, 3-chloropentane, 1,5-dichloropentane, vinyl chloride, 1,1-dichloroethylene, 1,2-dichloroethylene, tetrachloroethylene, trichloroethylene, 1-chloropropene, 2-chloropropene, 3-chloropropene, 1,2-dichloropropene, 2,3-dichloropropene, 4-chloro-1-butene, cyclopentyl chloride, cyclohexyl chloride, hexachlorocyclopentadiene, etc., as well as the corresponding bromine, fluorine and iodine substituted hydrocarbons. The process of this invention is particularly useful to effect chlorine-bromine exchange.

The temperature at which the halogen exchange reaction is effected is from about 25° C. to a temperature less than the dehydrohalogenation temperature of the halogen substituted hydrocarbon. That the dehydrohalogenation temperature varies with contact time and with the particular halogen substituted hydrocarbon is well known to the art. Thus, in the case of monohalides in general, dehydrohalogenation occurs at about 50° C. at extended reaction or contact times, and under these circumstances the halogen exchange process is effected at a temperature of from about 25° C. to a temperature less than about 50° C. without undue dehydrohalogenation. However, higher temperatures, but generally not exceeding about 300° C., may be employed with a suitably limited contact time, and generally not in excess of about 250° C. where the monohalide is a tertiary halide, and not in excess of about 150° C. in the case of the relatively unstable iodides. When the halogen substituted hydrocarbon is a dihalide generally higher temperatures may be employed, say from about 25° C. to a temperature of about 400° C. The optimum temperature and contact time in any case is readily determined by those skilled in the art, it being necessary only to avoid dehydrohalogenation conditions as evidenced by excessive hydrogen halide in the reactant phase.

In accordance with the process of the present invention, the halogen of a halogen substituted hydrocarbon is substituted with a different halogen on contacting said halogen substituted hydrocarbon with a Friedel-Crafts metal halide composited with a refractory oxide, the solid composite being designated herein as a halogen exchange agent. The present process, characterized as a halogen exchange reaction, involves the substitution of the halogen of the halogen substituted hydrocarbon by at least a portion of the halogen contained in the halogen exchange agent, the halogen of the exchange agent being in turn substituted by the halogen of the halogen substituted hydrocarbon initially charged.

The refractory oxide can be a refractory metal oxide including such as alumina, silica, zirconia, chromia, zinc oxide, titania, silica-alumina, chromia-alumina, alumina-boria, silica-zirconia, etc., as well as naturally occurring refractory oxides such as bauxite, kaolin or clay which may or may not have been heat and/or acid treated to improve the surface area, diatomaceous earth, which is frequently referred to as siliceous earth, diatomaceous silicate, kieselguhr, etc., also spinels like magnesia-alumina spinels or zinc oxide spinels, and the like. Of the above-mentioned refractory oxides, a synthetically prepared alumina is preferred. Suitable metal halides of the Friedel-Crafts type include aluminum halides such as aluminum chloride, aluminum bromide, aluminum iodide, aluminum fluoride, etc., ferric halides such as ferric chloride, ferric bromide, etc., and also the various zinc, beryllium, gallium, titanium, zirconium and stannic halides generally included as Friedel-Crafts metal halides. Of these Friedel-Crafts metal halides, the aluminum halides are preferred, the particular aluminum halide being dependent upon the particular halogen exchange desired to be accomplished.

As previously stated, a synthetically prepared alumina is particularly preferred. Methods of preparation of synthetic aluminas are well known. For example, they may be prepared by calcination of alumina gels which are commonly formed by adding a reagent, such as ammonium hydroxide, ammonium carbonate, etc. to a salt of aluminum, such as aluminum chloride, aluminum sulfate, aluminum nitrate, etc., in an amount to form aluminum hydroxide which, upon drying and calcination, is converted to the desired alumina. Aluminum chloride is generally preferred as the aluminum salt, not only for convenience and subsequent washing and filtering procedures, but also because it appears to give the better results. Alumina gels may also be prepared by the reaction of sodium aluminate with an acidic reagent to precipitate an aluminum hydroxide gel. Synthetic aluminas may also be prepared by the formation of alumina sols, for example by the reactoin of metallic aluminum with hydrochloric acid, which sols can be gelled with suitable precipitating agents such as ammonium hydroxide, followed by drying and calcination. While such aluminas may contain relatively small amounts of water of hydration, gamma-alumina is a preferred synthetically prepared alumina for use as the refractory oxide component of the preferred halogen exchange agent.

In a preferred embodiment, hydrogen is admixed with the halogen substituted hydrocarbon to maintain the surface of the halogen exchange agent substantially free of polymeric materials resulting from polymerization of halogen substituted hydrocarbons. Hydrogen consumption is exceedingly low. Sufficient hydrogen should be employed to provide a hydrogen-halohydrocarbon ratio within the molar range of from about 0.25 to about 10, the bulk of the hydrogen being utilized for recycle. In this preferred situation, the halogen exchange agent further comprises a Group VIII metal composited therewith, e.g., iron, nickel, cobalt, rhodium, ruthenium, palladium, osmium, iridium and platinum. The platinum group metals of Group VIII, i.e., rhodium, ruthenium, palladium, osmium, iridium and particularly platinum are preferred. The Group VIII metal may be composited with the alumina in any of the many well-known methods. For example, in the case of the preferred platinum, an ammoniacal solution of chloroplatinic acid may be admixed with alumina followed by drying and reduction. By another method, chloroplatinic acid in the desired quantity can be added to an alumina gel slurry followed by precipitation of the platinum therefrom on the alumina by means of hydrogen sulfide or other sulfiding agents. In still another method, the platinum can be coprecipitated with the alumina gel, for example, by introduction of a suitable soluble compound of platinum into an alumina sol followed by the addition of a precipitating agent. While the quantity of platinum compounded with the alumina is not critical, for economic reasons, the amount of platinum is usually kept as a minimum. Thus, while large amounts of platinum are not detrimental, it is generally preferred to utilize from about 0.01 to about 2% by weight of platinum based on the weight of the final composite.

The refractory oxide and Group VIII metal composite is preferably impregnated with an aluminum halide such as aluminum chloride to form the desired halogen exchange agent. This can be accomplished readily by sublimation of, for example, aluminum chloride onto the surface of the refractory oxide Group III metal composite. Aluminum chloride sublimes at about 183° C., and thus a suitable impregnation temperature will range from about 190° C. to about 350° C. This sublimation can be carried out under pressure if desired, and also in the presence of diluents including inert paraffin hydrocarbon gases, and in either liquid or vapor phase. When the sublimation is carried out at atmospheric pressure, the temperature is generally kept in the lower portion of the above-indicated temperature range since the aluminum chloride impregnated on the composite exerts its own vapor pressure and will therefore tend to reach a maximum concentration at that temperature. The amount of metal halide utilized in the present halogen exchange agent will range up to about 50 wt. percent based on the weight of the final composite utilized as a halogen exchange agent.

The aluminum halide is considered to exist in chemical combination with the refractory oxide as an oxy-aluminum halide resulting from reaction of the aluminum halide with residual hydroxyl groups such as occur on the surface of an alumina crystal lattice. With the aluminum halide superimposed on the refractory oxide surface in this manner, the halogen portion thereof is in a position to exchange with other halogen, even if larger, since the incoming halogen ions do not have to penetrate the surface crystal lattice of the refractory oxide. This is in contrast to the case where hydrogen halide is reacted with the aforementioned residual hydroxyl groups of the refractory oxide to replace the same with halogen and form a water byproduct. In the latter case, although a halogen is disposed on the refractory oxide surface it is substantially inactive with respect to halogen exchange in that replacement is possible only with ions which can penetrate the surface crystal lattice of the refractory oxide without undue strain. Regardless of whether or not this is the case, the halogen exchange agent comprises a Friedel-Crafts metal halide disposed on the surface of a refractory oxide and it is this particular association which results in the unusual characteristics of the halogen exchange agent herein described.

A stoichiometric exchange of halogen between the halogen substituted hydrocarbon and the halogen exchange agent occurs during the present process. The exchange of halogen is accompanied by the appearance of a different halogen substituted hydrocarbon in the reactant phase and the conversion of the Friedel-Crafts metal halide. During the course of the halogen exchange process the halogen exchange agent in effect becomes "saturated" with the halogen acquired from the halogen substituted hydrocarbon initially charged. The halogen thus acquired is released and the exchange agent restored to its initial composition on contacting the exchange agent with a hydrogen halide comprising the halogen initially present in the halogen exchange agent.

The process of this invention can be effected by any conventional or otherwise convenient method and may comprise a batch or a continuous type of operation. For example, in a continuous type of operation the halogen substituted hydrocarbon to be treated is passed in upward or downward flow through and in contact with the halogen exchange agent disposed in a fixed bed in a particulate form within a reactor, the halogen substituted hydrocarbon being preferably charged in admixture with hydrogen. The halogen exchange product recovered in the reactor effluent is separated from unconverted starting material, the latter together with excess hydrogen being recycled to the reactor as a portion of the feed thereto. In such process a suitable liquid hourly space velocity, defined as the volume of reactant per unit time per volume of exchange agent, is within a range of from about 0.1 to about 10, depending, as previously mentioned, on the particular halohydrocarbon treated and temperature employed. As the halogen exchange agent acquires halogen from the halogen substituted hydrocarbon and eventually becomes "saturated," hydrogen halide comprising halogen initially present in the exchange agent is passed through and in contact with the "saturated" exchange agent and the halogen acquired from the halogen substituted hydrocarbon is released and the exchange agent restored to its initial composition.

The following example is presented in illustration of the process of this invention and is not intended as a limitation on the generally broad scope of the invention as set out in the appended claims.

*Example*

A platinum-alumina composite is first prepared by dissolving aluminum pellets in hydrochloric acid, forming a sol comprising about 15% aluminum. The sol is admixed with hexamethylene tetraamine and added drop wise to an oil bath at about 90° C. to form spherical particles. The spheres are aged in oil and then in an aqueous ammonia solution. The washed spheres are dried at about 250° C. and calcined at 600° C. The calcined spheres are thereafter impregnated with chloroplatinic acid in dilute ammoniacal solution, the chloroplatinic acid concentration being adjusted so that the final composite contains about 0.375 wt. percent platinum. A final composite further comprising about 18.5 wt. percent aluminum chloride is prepared by placing about 70 grams of the platinum-alumina composite in a glass liner together with about 52 grams of anhydrous aluminum chloride, inserting said liner in a rotatable autoclave, and heating the same at about 250° C. with rotation of the autoclave over a 2 hour period under 25 p.s.i. initial hydrogen pressure. About 50 cc. of the spherical halogen exchange agent thus prepared is placed in a fixed bed of a vertical tubular reactor and maintained therein under anhydrous conditions at a temperature of about 100° C. Hydrogen and 2,3-dibromobutane are charged upflow to the reactor in a mole ratio of about 5:1, the dibromobutane being charged at a liquid hourly space velocity of about 0.5. The reactor effluent is recovered overhead and cooled to about room temperature. Excess hydrogen is recycled as a portion of the reactor charge and the 2,3-dichlorobutane conversion product is recovered. After a period of about 2 hours, the hydrogen-dibromobutane flow is halted and hydrogen chloride is charged upwardly through the halogen exchange agent until hydrogen bromide is no longer observed in the reactor effluent. The halogen exchange agent is thus restored to its initial composition and further quantities of 2,3-dibromobutane and hydrogen are charged thereto.

We claim as our invention:

1. A process for exchanging a halogen of a halogen substituted hydrocarbon with a different halogen, haloalkanes having from 3 to 5 carbon atoms, haloalkenes having 2 to 4 carbon atoms, halocycloalkanes having 5 or 6 carbon atoms in the ring and halocyclopentadienes which process comprises contacting said halogen substituted hydrocarbon admixed with hydrogen with a halogen exchange agent at a temperature in excess of about 25° C. up to about 400° C. and less than the dehydrohalogenation temperature of the halogen substituted hydrocarbon, said halogen exchange agent comprises a Friedel-Crafts metal halide and a Group VIII metal composited with a refractory inorganic oxide, said metal halide comprising halogen different than the halogen of the halogen substituted hydrocarbon starting material.

2. A process for exchanging a halogen of a halogen substituted hydrocarbon with a different halogen, haloalkanes having from 3 to 5 carbon atoms, haloalkenes having 2 to 4 carbon atoms, halocycloalkanes having 5 or 6 carbon atoms in the ring and halocyclopentadienes which process comprises contacting said halogen substituted hydrocarbon admixed with hydrogen with a halogen exchange agent at a temperature in excess of about 25° C. up to about 400° C. and less than the dehydrohalogenation temperature of the halogen substituted hydrocarbon, said halogen exchange agent comprising a Friedel-Crafts metal halide and a Group VIII metal composited with alumina, said metal halide comprising halogen different than the halogen of the halogen substituted hydrocarbon starting material.

3. The process of claim 2 further characterized in that said halogen substituted hydrocarbon is a polyhaloalkane of from 3 to 5 carbon atoms per molecule.

4. The process of claim 2 further characterized in that said halogen substituted hydrocarbon is a polyhalocycloalkane having 5 or 6 carbon atoms in the ring.

5. A process for exchanging a halogen of a halogen substituted hydrocarbon with a different halogen, haloalkanes having from 3 to 5 carbon atoms, haloalkenes having 2 to 4 carbon atoms, halocycloalkanes having 5 or 6 carbon atoms in the ring and halocyclopentadienes which process comprises contacting said halogen substituted hydrocarbon admixed with hydrogen with a halogen exchange agent at a temperature in excess of about 25° C. up to about 400° C. and less than the dehydrohalogenation temperature of the halogen substituted hydrocarbon, said halogen exchange agent comprising an aluminum halide and a Group VIII metal composited with alumina, and said aluminum halide comprising halogen different than the halogen of the halogen substituted hydrocarbon starting material.

6. The process of claim 5 further characterized in that said halogen substituted hydrocarbon is a polyhaloalkane of from 3 to 5 carbon atoms per molecule.

7. The process of claim 5 further characterized in that said halogen substituted hydrocarbon is a polyhalocycloalkane having 5 or 6 carbon atoms in the ring.

8. A process for exchanging a halogen of a halogen substituted hydrocarbon with a different halogen, haloalkanes having from 3 to 5 carbon atoms, haloalkenes having 2 to 4 carbon atoms, halocycloalkanes having 5 or 6 carbon atoms in the ring and halocyclopentadienes which process comprises contacting said halogen substituted hydrocarbon admixed with hydrogen with a halogen exchange agent at a temperature in excess of about 25° C. up to about 400° C. and less than the dehydrohalogenation temperature of the halogen substituted hydrocarbon, said halogen exchange agent comprising an aluminum halide and a platinum group metal composited with alumina, and said aluminum halide comprising halogen different than the halogen of the halogen substituted hydrocarbon starting material.

9. The process of claim 8 further characterized in that said halogen substituted hydrocarbon is a polyhaloalkane of from 3 to 5 carbon atoms per molecule.

10. The process of claim 8 further characterized in that said halogen substituted hydrocarbon is a polyhalocycloalkane having 5 or 6 carbon atoms in the ring.

11. A process for exchanging a halogen of a halogen substituted hydrocarbon with a different halogen, haloalkanes having from 3 to 5 carbon atoms, haloalkenes having 2 to 4 carbon atoms, halocycloalkanes having 5 or 6 carbon atoms in the ring and halocyclopentadienes which process comprises contacting said halogen substituted hydrocarbon admixed with hydrogen with a halogen exchange agent at a temperature in excess of about 25° C. up to about 400° C. and less than the dehydrohalogenation temperature of the halogen substituted hydrocarbon, said halogen exchange agent comprising an aluminum halide and platinum composited with alumina, said aluminum halide comprising halogen different than the halogen of the halogen substituted hydrocarbon starting material.

12. The process of claim 11 further characterized in that said halogen substituted hydrocarbon is a polyhaloalkane of from 3 to 5 carbon atoms per molecule.

13. The process of claim 11 further characterized in that said halogen substituted hydrocarbon is a polyhalocycloalkane having 5 or 6 carbon atoms in the ring.

14. A process for exchanging a bromine substituent of a bromoalkane of from 3 to 5 carbon atoms per molecule with chlorine which process comprises contacting said bromoalkane admixed with hydrogen with a halogen exchange agent at a temperature in excess of about 25° C. up to about 400° C. and less than the dehydrohalogenation temperature of the bromoalkane, said halogen exchange agent comprising aluminum chloride and platinum composited with alumina.

References Cited

UNITED STATES PATENTS

| 2,426,637 | 9/1947 | Murray | 260—658 |
| 2,478,933 | 8/1949 | Bratton et al. | 260—658 |
| 2,553,518 | 8/1951 | Lake et al. | 260—648 |

FOREIGN PATENTS

| 849,434 | 9/1960 | Great Britain. |

LEON ZITVER, *Primary Examiner.*

M. JACOB, *Assistant Examiner.*